United States Patent
Liu et al.

(10) Patent No.: US 11,340,730 B2
(45) Date of Patent: May 24, 2022

(54) DRIVING METHOD FOR TOUCH DISPLAY PANEL, AND TOUCH DISPLAY APPARATUS

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Jinxing Liu, Beijing (CN); Ming Chen, Beijing (CN); Xue Dong, Beijing (CN); Bo Gao, Beijing (CN); Wenjia Sun, Beijing (CN); Xiaozhou Liu, Beijing (CN); Yannan Xiong, Beijing (CN); Jiahao Liu, Beijing (CN); Shaoru Zhang, Beijing (CN); Yang Chen, Beijing (CN)

(73) Assignees: BEIJING BOE OPTOELECTRONICS TECHNOLOGY CO., LTD., Beiling (CN); BOE TECHNOLOGY GROUP CO., LTD., Beijing (CN)

( * ) Notice: Subject to any disclaimer, the term of this patent is extended or adjusted under 35 U.S.C. 154(b) by 38 days.

(21) Appl. No.: 17/052,304

(22) PCT Filed: Mar. 23, 2020

(86) PCT No.: PCT/CN2020/080658
§ 371 (c)(1),
(2) Date: Nov. 2, 2020

(87) PCT Pub. No.: WO2020/192626
PCT Pub. Date: Oct. 1, 2020

(65) Prior Publication Data
US 2021/0240328 A1    Aug. 5, 2021

(30) Foreign Application Priority Data

Mar. 27, 2019 (CN) .......................... 201910238674.8

(51) Int. Cl.
*G06F 3/041* (2006.01)
*G02F 1/1333* (2006.01)
(Continued)

(52) U.S. Cl.
CPC ...... *G06F 3/04166* (2019.05); *G02F 1/13338* (2013.01); *G06F 3/044* (2013.01);
(Continued)

(58) Field of Classification Search
CPC combination set(s) only.
See application file for complete search history.

(56) References Cited

U.S. PATENT DOCUMENTS

2019/0088224 A1\* 3/2019 Fujimoto ............. G09G 3/3655

FOREIGN PATENT DOCUMENTS

CN   1280353 A    1/2001
CN   106128374 A  11/2016
(Continued)

OTHER PUBLICATIONS

International Search Report of PCT/CN2020/080658 in Chinese, dated Jun. 23, 2020 with English translation.
(Continued)

*Primary Examiner* — Robin J Mishler
(74) *Attorney, Agent, or Firm* — Collard & Roe, P.C.

(57) ABSTRACT

Disclosed are a driving method for a touch display panel, and a touch display apparatus. The driving method for a touch display panel includes: providing a sinusoidal signal y for each electrode block in a common electrode within a display period, wherein the display period includes N display stages, each display stage has M image frames, the refresh rate of the display period is greater than or equal to a refresh rate threshold value A, $N \geq 2$, $M \leq 1$, N is a positive integer, M is a positive number, and the refresh rate threshold value A is the maximum refresh rate that can be
(Continued)

identified by human eyes; providing a data signal for multiple pixel electrodes; and an electric field, formed by the pixel electrodes and the common electrode, driving the inversion of liquid crystal molecules in a liquid crystal layer.

20 Claims, 6 Drawing Sheets

(51) Int. Cl.
     *G06F 3/044*          (2006.01)
     *G09G 3/36*           (2006.01)

(52) U.S. Cl.
     CPC ......... *G06F 3/0412* (2013.01); *G09G 3/3655* (2013.01); *G09G 3/3674* (2013.01); *G09G 2310/0202* (2013.01); *G09G 2310/08* (2013.01); *G09G 2320/0233* (2013.01); *G09G 2360/16* (2013.01)

(56) References Cited

FOREIGN PATENT DOCUMENTS

| | | | |
|---|---|---|---|
| CN | 109523961 | A | 3/2019 |
| CN | 109976581 | A | 7/2019 |
| CN | 110268376 | A | 9/2019 |
| JP | 2010052315 | A | 3/2010 |

OTHER PUBLICATIONS

Written Opinion of the International Searching Authority of PCT/CN2020/080658 in Chinese, dated Jun. 23, 2020.

\* cited by examiner

DRIVING METHOD FOR TOUCH DISPLAY PANEL, AND TOUCH DISPLAY APPARATUS

CROSS REFERENCE TO RELATED APPLICATIONS

This application is the National Stage of PCT/CN2020/080658 filed on Mar. 23, 2020, which claims priority under 35 U.S.C. § 119 of Chinese Application No. 201910238674.8 filed on Mar. 27, 2019, the disclosure of which is incorporated by reference.

TECHNICAL FIELD

Embodiments of the present disclosure relates to a display technical field, particularly to a driving method for a touch display panel, and a touch display device.

BACKGROUND

Touch display panel (Touch Screen Panel) has gradually spread to people's lives. At present, in the process of touch display, touch signals and display signals are output in a time-dividing manner. However, with regard to the display panel with higher resolution, the amount of sub pixels in one row is more. In this way, upon the touch signals and the display signals being output in a time-dividing manner, the time for one row of sub pixels to receive the display signals is shorter, which causes some sub pixels to be undercharged.

SUMMARY

An aspect of the present disclosure provides a driving method for a touch display panel, wherein the touch display panel includes a liquid crystal layer, a common electrode, and a plurality of pixel electrodes, the common electrode includes a plurality of electrode blocks arranged at intervals and insulated from each other, the driving method includes: in a display period, providing a sinusoidal signal y to each of the plurality of electrode blocks in the common electrode; wherein the display period includes N display stages, each of the display stages includes M image frames, and a refresh rate of the display period is greater than or equal to a refresh rate threshold A, N≥2, M≤1, N is a positive integer, M is a positive number, and the refresh rate threshold is a maximum refresh rate recognizable by human eyes; providing data signals to the plurality of the pixel electrodes; and an electric field formed by the plurality of pixel electrodes and the common electrode driving liquid crystal molecules in the liquid crystal layer to rotate, and the touch display panel displaying.

In some of the embodiments of the present disclosure, in the display period, providing the sinusoidal signal y to each of the plurality of electrode blocks in the common electrode includes: continuously providing the sinusoidal signal y to each of the plurality of electrode blocks in the common electrode during the entire display period.

In some of the embodiments of the present disclosure, the sinusoidal signal y is a single-frequency sinusoidal signal.

In some of the embodiments of the present disclosure, each of the plurality of electrode blocks serves as a touch electrode to form a self-capacitance with a ground terminal.

In some of the embodiments of the present disclosure, in the display period, an average luminance value of any sub pixel in the touch display panel is approximately the same as a target luminance value of the sub pixel.

In some of the embodiments of the present disclosure, in the display period, before providing the single-frequency sinusoidal signal y to each of the plurality of electrode blocks in the common electrode, the driving method includes: acquiring a central voltage Vh, and upon the central voltage Vh being taken as a voltage of the electrode block in one sub pixel, a luminance value of the sub pixel is taken as the target luminance value of the sub pixel; wherein the center voltage Vh is a voltage of a symmetrical center of the single-frequency sinusoidal signal.

In some of the embodiments of the present disclosure, in the display period, before providing the single-frequency sinusoidal signal y to each of the plurality of electrode blocks in the common electrode, the driving method further includes: acquiring a refresh rate B of one image frame of the touch display panel; and determining the amount N of the display stages in the display period and the amount M of the image frames in each of the display stages according to the refresh rate B and the refresh rate of the display period.

In some of the embodiments of the present disclosure, in the display period, before providing the single-frequency sinusoidal signal y to each of the plurality of electrode blocks in the common electrode, the driving method further includes: acquiring a refresh time t of one image frame according to the refresh rate B of the image frame; acquiring a voltage difference $\Delta V1$ between a pixel voltage Vp and a common voltage Vcom in each of the display stages according to the refresh time t of the image frame, the sinusoidal function $y=A \sin(\omega t+\varphi)$, and the central voltage Vh; wherein, in one display stage, upon the pixel voltage Vp being positive, the voltage difference is: $\Delta V1=|Vp-Vh|-A\sin(\omega(t0+t\times j)+\varphi)$; in a display stage, upon the pixel voltage Vp being negative, the voltage difference is: $\Delta V1=|Vp-Vh|+A\sin(\omega(t0+t\times j)+\varphi)$; t0 is a starting time of the single-frequency sinusoidal signal, and t0≥0; t×j is a time of one display stage in the display period, and 0≤j≤C; acquiring an average luminance value L1 of any sub pixel in the touch display panel in the display period according to the voltage difference $\Delta V1$ in each of the display stages in the display period; acquiring a voltage difference $\Delta V2$ between the pixel voltage Vp and the center voltage Vh in the display period, and acquiring a target value luminance L2 of any sub pixel in the touch display panel in the display period according to the voltage difference $\Delta V2$; calculating a frequency set of the single-frequency sinusoidal signal according to L1=L2; and selecting at least one value from the frequency set as a frequency of the single-frequency sinusoidal signal.

In some of the embodiments of the present disclosure, acquiring the luminance average L1 in the display period of any sub pixel in the touch display panel according to the voltage difference $\Delta V1$ in each of the display stages includes: in each of the display stages, acquiring a luminance value of any sub pixel in the touch display panel in the display stage according to the voltage difference $\Delta V1$; and carrying out weighted average on multiple luminance values of the display stages in the display period to acquire the average luminance L1 in the display period.

In some of the embodiments of the present disclosure, in each of the display stages, acquiring the luminance value of any sub pixel in the touch display panel in the display stage according to the voltage difference $\Delta V1$ includes: in each of the display stages, acquire a function $L=H(V)$ of the voltage difference $\Delta V1$ and the luminance value of the sub pixel by using an electro-optical characteristic curve of the touch display panel; and calculating the luminance value of any sub pixel in the touch display panel in the display stage according to the function $L=H(V)$.

In some of the embodiments of the present disclosure, selecting at least one value from the frequency set as the frequency of the single-frequency sinusoidal signal includes: acquiring a scanning period Ta of each row of sub pixels according to a resolution of the touch display panel; the frequency of the single-frequency sinusoidal signal is f=kTa/2, k>0, k is an integer.

In some of the embodiments of the present disclosure, the scanning period Ta satisfies a formula: Ta=1/(B×S), in which S is an amount of gate lines for receiving gate scanning signals in an active area of the touch display panel.

In some of the embodiments of the present disclosure, before acquiring the voltage difference ΔV1 between the pixel voltage Vp and the common voltage Vcom in each of the display stages, the driving method further includes: setting an initial phase φ in the sinusoidal function y=A sin(ωt+φ) to zero.

In some of the embodiments of the present disclosure, before acquiring the voltage difference ΔV1 between the pixel voltage Vp and the common voltage Vcom in each of the display stages, the driving method further includes: setting a voltage on the charged pixel electrode at a timing that a transistor connected with the pixel electrode is turned off as the pixel voltage Vp.

Another aspect of the present disclosure provides a touch display device, including a touch display panel, a memory and a processor, wherein the memory stores a computer program capable of being executed by the processor, and the processor implements any driving method described above upon executing the computer program.

In some of the embodiments of the present disclosure, the touch display panel includes a liquid crystal layer, a common electrode, and a plurality of pixel electrodes; the common electrode includes a plurality of electrode blocks which are arranged at intervals and insulated from each other; the touch display device further includes a driving circuit connected with the processor; the driving circuit includes a sinusoidal signal driving sub-circuit and a source driving sub-circuit; the sinusoidal signal driving sub-circuit is electrically connected with the plurality of electrode blocks in the common electrode, and is configured for providing the sinusoidal signal y to each of the plurality of electrode blocks in the common electrode; the source driving sub-circuit is electrically connected with the pixel electrodes in respective sub pixels in the touch display panel, and is configured for providing data signals to the plurality of pixel electrodes.

In some of the embodiments of the present disclosure, the driving circuit further includes a gate driving sub-circuit; the gate driving sub-circuit is connected with a plurality of gate lines of the touch display panel, and is configured for providing gate scanning signals to the plurality of gate lines.

Another aspect of the present disclosure provides a computer readable medium, storing a computer program, wherein the computer program implements any method described above upon being executed by a processor.

BRIEF DESCRIPTION OF THE DRAWINGS

In order to clearly illustrate the technical solution of the embodiments of the present disclosure or prior art, the drawings to be used in description of the embodiments or prior art will be briefly described in the following; it is obvious that the described drawings are only related to some embodiments of the present disclosure. Base on the drawings, those ordinarily skilled in the art can obtain other related drawings, without any inventive work.

DETAILED DESCRIPTION

Hereinafter, the technical solutions in the embodiments of the present disclosure will be described clearly and completely with reference to the drawings in the embodiments of this disclosure. Obviously, the described embodiments are only part of the embodiments of the present disclosure, not all of them. Based on the embodiments in the present disclosure, all other embodiments acquired by ordinary skilled person in the art without creative labor belong to the protection scope of the present disclosure.

Figure 1:
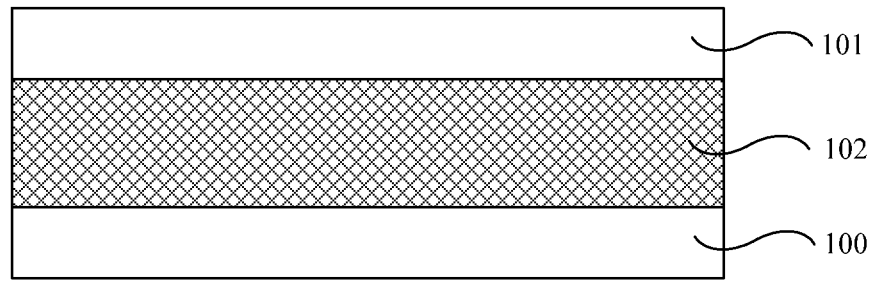
FIG. 1 is a schematic structural diagram of a touch display panel provided by an embodiment of the present disclosure.

An embodiment of the present disclosure provides a touch display panel 01. As illustrated by FIG. 1, the touch display panel 01 includes an array substrate 100 and a cell-assembling substrate 101 which are oppositely arranged, and a liquid crystal layer 102 located between the array substrate 100 and the cell-assembling substrate 101.

Figure 2:
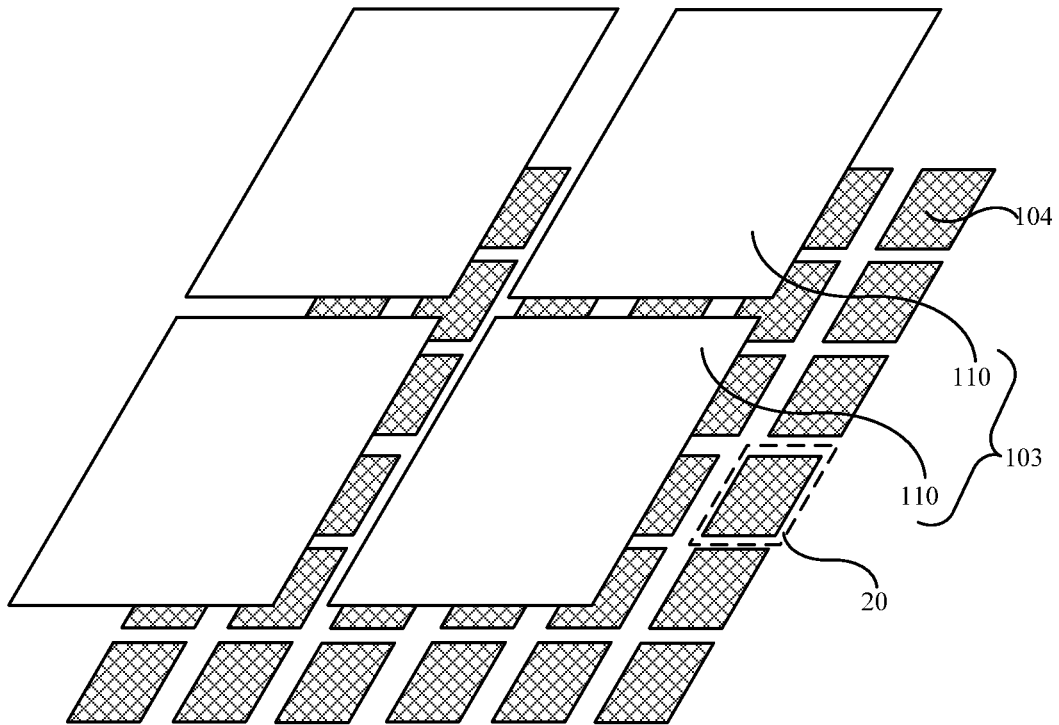
FIG. 2 is a schematic structural diagram of a pixel electrode and a common electrode in a touch display panel provided by an embodiment of the present disclosure.

In addition, the touch display panel 01 further includes a common electrode 103 and a plurality of pixel electrodes 104 as illustrated by FIG. 2. An active area (AA) of the touch display panel includes a plurality of sub pixels 20. Each of the plurality of sub pixels 20 is provided with a pixel electrode 104 therein.

In some embodiments of the present disclosure, the abovementioned touch display panel can be an advanced-super dimensional switching (ADS) type liquid crystal touch display panel. In this case, the common electrode 103 and the pixel electrode 104 can both be manufactured on the array substrate 100. The pixel electrode 104 can include a plurality of strip-shaped sub-electrodes which are electrically connected and arranged at intervals.

Or, in other embodiments of the present disclosure, the touch display panel can be a twist nematic (TN) type liquid crystal touch display panel. In this case, the common electrode 103 can be manufactured on the cell-assembling substrate 101, and the pixel electrode 104 can be manufactured on the array substrate 100.

In addition, the common electrode 101 includes a plurality of electrode blocks 110 which are disposed at intervals and insulated from each other. Each of the plurality of electrode blocks 110 covers Q×Q sub pixels, Q≥2, and Q is a positive integer. Because each of the sub pixels 20 includes one pixel electrode 104 therein, thus, one electrode block 110 in the common electrode 103 can cover Q×Q sub pixels 104.

In this case, the electrode block 110 serves as a touch electrode to form a self-capacitance with a ground terminal (GND). Upon a user's finger touching the touch display panel, a capacitance value of the self-capacitance formed between the electrode block 110 at the touched position and the ground terminal changes, so that the touched position of the user can be determined.

Figure 3:
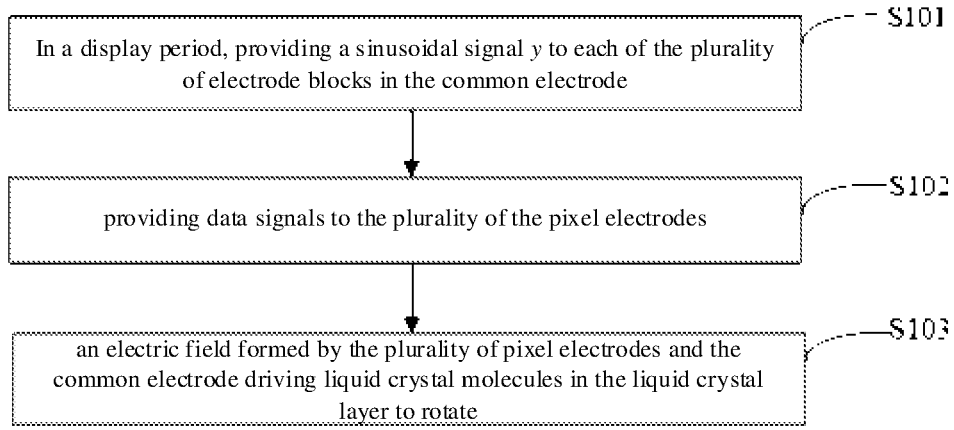
FIG. 3 is a flowchart of a driving method for a touch display panel provided by an embodiment of the present disclosure.

Based on the abovementioned structure of the touch display panel, in order to realize the synchronization of a touch operation and a display operation, an embodiment of the present disclosure provides a driving method for a touch display panel 01, as illustrated by FIG. 3, the driving method includes S101-S103.

S101: in a display period P, a sinusoidal signal y=A sin(ωt+φ) is provided to each of the plurality of electrode blocks 110 in the common electrode 103. The sinusoidal signal y serves as a common voltage Vcom and a touch signal. The sinusoidal signal y can be a single-frequency signal or a multi-frequency signal.

The case where y is a single-frequency sinusoidal signal is taken as an example. In y=A sin(ωt+φ), A represents the amplitude of the single-frequency sinusoidal signal y. The single-frequency sinusoidal signal y has a vibration period T=2 π/ω; ωt+φ is the phase. When t=0, the phase is the initial phase. It should be understood that, in practical products, due to circuit design, interference, and other factors, impure single-frequency signals may result, and y is similar to a multi-frequency signal. In addition, y can be a multi-frequency sinusoidal signal, and in some embodiments, a fixed frequency point is preferred, because the fixed frequency point has advantages in noise processing, spread spectrum processing, and the like. The following description will take the case where y is a single-frequency sinusoidal signal as an example, but the present disclosure is not limited thereto.

Figure 4:
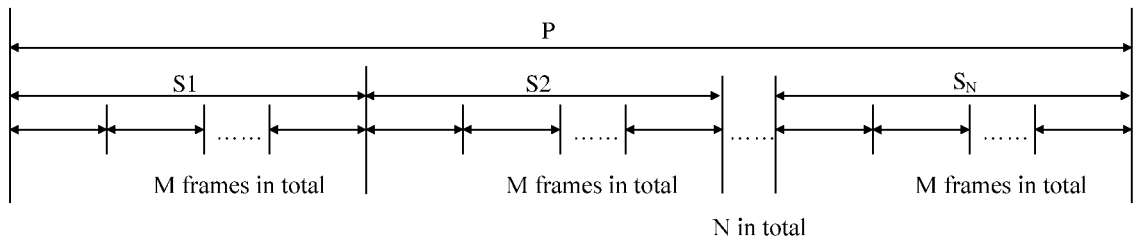
FIG. 4 is a schematic diagram of a display period division provided by an embodiment of the present disclosure.

In addition, as illustrated by FIG. 4, the display period P includes N display stages (S1, S2, . . . , Sn). Each of the display stages, for example S1, has M image frames. N≥2, M≤1, N is a positive integer, and M is a positive number.

The refresh rate of the display period P is greater than or equal to a refresh rate threshold A. The refresh rate threshold A is the maximum refresh rate recognizable by human eyes. Generally, the maximum refresh rate recognizable by human eyes is 24 Hz. Therefore, the refresh rate of the display period P is greater than or equal to 24 Hz.

Therefore, in order to determine the amount N of display stages in a display period P and the amount M of image frames in each of the display stages, before the abovementioned step S101, the driving method for the touch display panel 01 further includes:

First, a refresh rate B of an image frame of the touch display panel 01 is acquired.

Then, according to the refresh rate of the display period, the amount N of the display stages in the display period P and the amount M of image frames in each of the display stages are determined.

Figure 5:
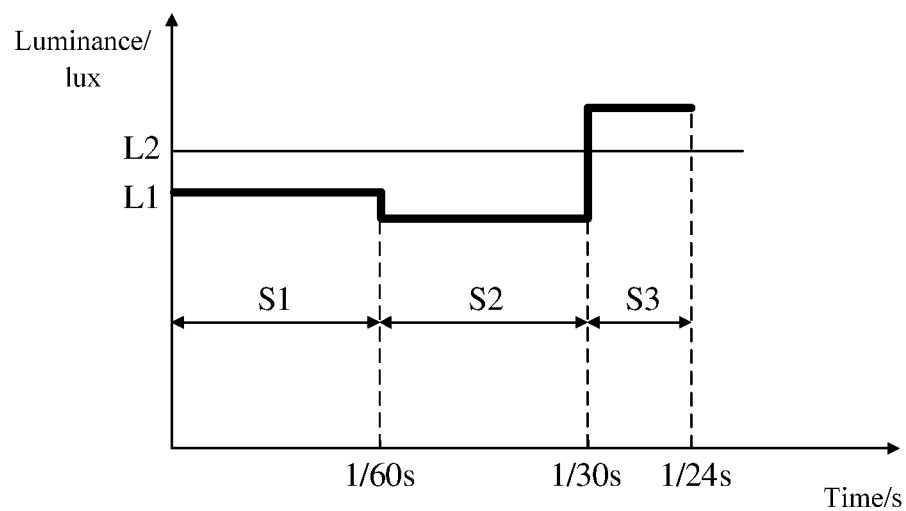
FIG. 5 is a schematic diagram of another display period division provided by an embodiment of the present disclosure.
Figure 6:
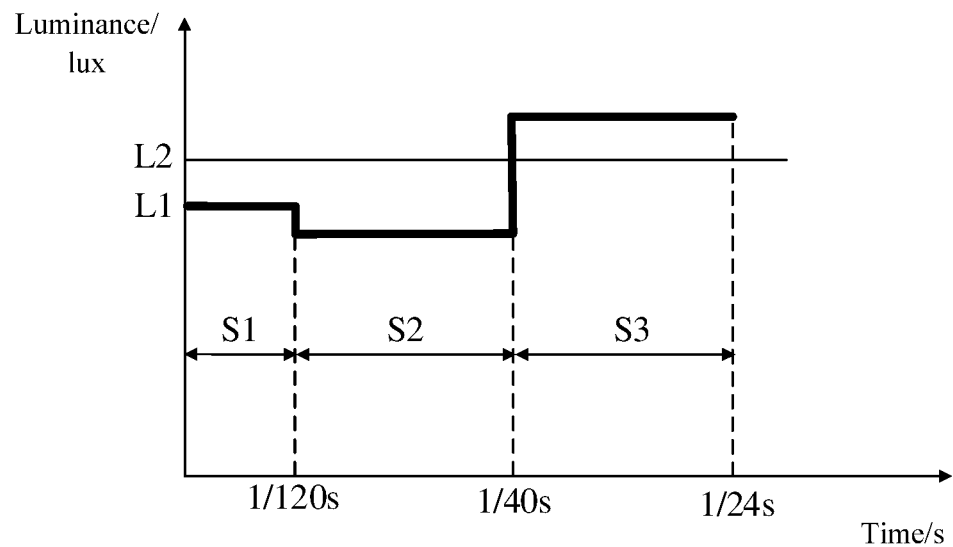
FIG. 6 is a schematic diagram of another display period division provided by an embodiment of the present disclosure.

For example, B=60 Hz, A=24 Hz, C=60 Hz/24 Hz=2.5. In this case, there are 3 (N=3) display stages in the display period P, which are respectively the display stage S1, the display stage S2, and the display stage S3, as illustrated by FIG. 5 or FIG. 6. It should be understood that, in this example, the refresh rate of the display period is taking 24 Hz as an example; and the refresh rate of the display period can be different from this. For example, if the refresh rate of the display period is changed to 48 Hz, the amount of display stages will be reduced.

In addition, it can be seen that, each of the display stages is less than or equal to one image frame. Hereinafter, the setting of the amount M of the image frames in each of the display stages will be explained by an example.

For example, in some embodiments of the present disclosure, as illustrated by FIG. 5, in the display stage S1, the amount of image frames M=1, and in this case, the duration of the display stage S1 is 1/60 s, which is shown in FIG. 5 from 0 s to 1/60 s on the time axis.

In the display stage S2, the amount of image frames M=1, and the duration of the display stage S2 is 1/60s, which is shown in FIG. 5 from 1/60 s to 1/30 s on the time axis.

In the display stage S3, the amount of image frames M=0.5, and the duration of the display stage S3 is 1/120s, which is shown in FIG. 5 from 1/30 s to 1/24 s on the time axis.

Alternatively, in other embodiments of the present disclosure, as illustrated by FIG. 6, in the display stage S1, the amount of image frames M=0.5, and in this case, the duration of the display stage S1 is 1/120s, which is shown in FIG. 6 from 0 s to 1/120 s on the time axis.

In the display stage S2, the amount of image frames M=1, and the duration of the display stage S2 is 1/60s, which is shown in FIG. 6 from 1/120 s to 1/40 s on the time axis.

In the display stage S3, the amount of image frames M=1, and the duration of the display stage S3 is 1/60s, which is shown in FIG. 6 from 1/40 s to 1/24 s on the time axis.

Hereinafter, for convenience of explanation, the division of the display period P shown in FIG. 5 will be taken as an example.

S102. Data signals Vdata are provided to the plurality of pixel electrodes 104.

The abovementioned data signals Vdata are configured to provide pixel voltages Vp to the plurality of pixel electrodes 104.

S103. An electric field formed by the plurality of pixel electrodes 104 and the common electrode 103 drives liquid crystal molecules in the liquid crystal layer 102 to rotate.

That is, after the plurality of pixel electrodes 104 receive the abovementioned data signals Vdata and every electrode block 110 in the common electrode 103 receives the abovementioned single-frequency sinusoidal signal y=A sin(ωt+φ) as the common voltage Vcom, the electric field formed by the plurality of pixel electrodes 104 and the common electrode 103 can drive the liquid crystal molecules to rotate. In this case, the touch display panel 01 displays.

In the display period P, an average luminance value L1 of any sub pixel 20 in the touch display panel 01 is the same as a target luminance value L2 of the sub pixel 20 (as illustrated by FIG. 5 or FIG. 6).

Figure 7:
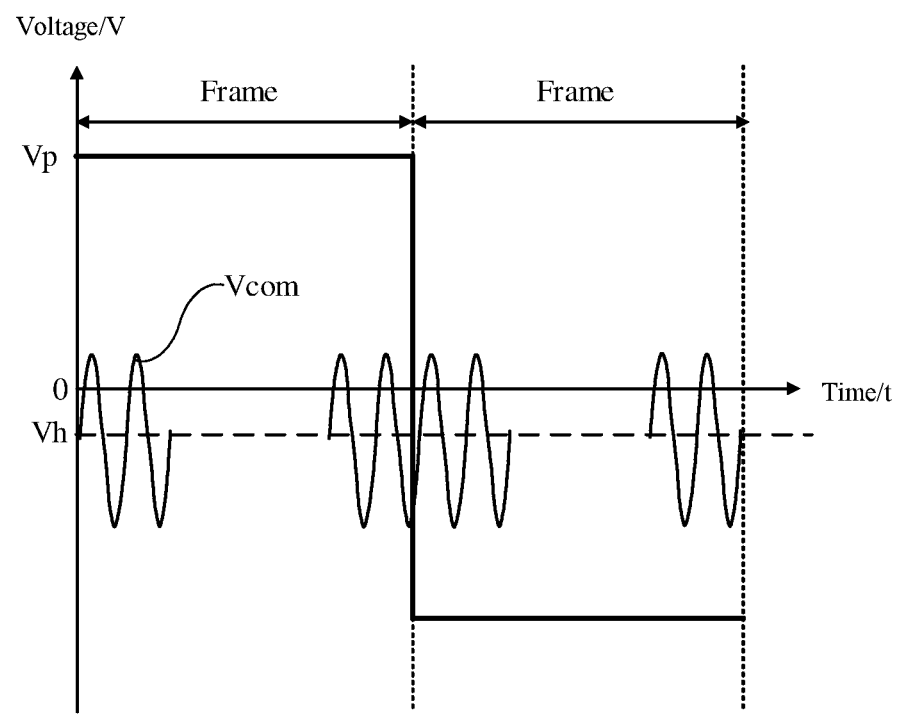
FIG. 7 is a schematic waveform diagram of a single-frequency sinusoidal signal and a pixel voltage provided by an embodiment of the present disclosure.

In order to obtain the target luminance value L2, before S101, the driving method for the touch display panel 01 further includes:

A center voltage Vh as illustrated by FIG. 7 is acquired. It can be seen from FIG. 7 that the center voltage Vh is a voltage of the symmetry center of the single-frequency sinusoidal signal y of the common voltage Vcom.

In this case, upon the center voltage Vh being used as the voltage of the electrode block 110 in the sub pixel 20, the luminance value of the corresponding sub pixel 20 is used as the target luminance value L2 of the sub pixel 20.

To sum up, in the display period P, each of the electrode blocks 110 in the common electrode 103 receives a single-frequency sinusoidal signal $y = A \sin(\omega t + \varphi)$ as illustrated by FIG. 7. In this case, in each of the image frames, the single-frequency sinusoidal signal y can be used as a touch signal. In this case, the electrode block 110 receiving the single-frequency sinusoidal signal y and the ground terminal (GND) can form a self-capacitance for achieving touch control.

Figure 8:
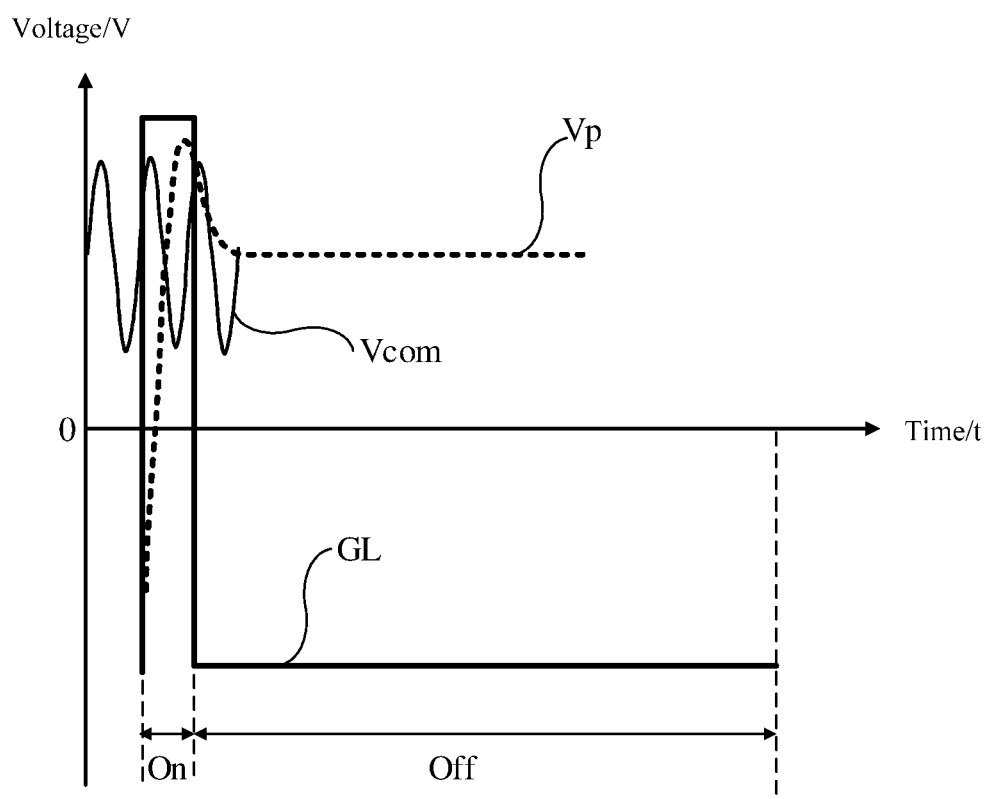
FIG. 8 is a schematic waveform diagram of another single-frequency sinusoidal signal and another pixel voltage provided by an embodiment of the present disclosure.

In addition, in the same image frame, the single-frequency sinusoidal signal y can also be used as a signal supplied to the common electrode 103 during display, that is, the common voltage Vcom supplied to the common electrode 103. Specifically, as illustrated by FIG. 8, upon a transistor connected to the pixel electrode 104 being in an ON state, the data signal Vdata is written to the pixel electrode 104 through the transistor, so that the data signal Vdata is charged into the pixel electrode 104 as the pixel voltage Vp.

In addition, due to the action of leakage current of the transistor, the pixel voltage Vp will decrease, but after the transistor is turned off, the pixel voltage Vp can maintain the voltage when the transistor is turned off during the one image frame. After the common electrode 103 receives the single-frequency sinusoidal signal y, the touch display panel 01 can display under the action of the electric field generated between the common electrode 103 and the pixel electrodes 104.

Based on this, during a display process of the touch display panel 01, the average luminance value L1 of any sub pixel 20 in the touch display panel 01 is the same as the target luminance L2 of the sub pixel 20 in a display period P, and the refresh rate of the display period P is greater than or equal to the maximum refresh rate recognizable by human eyes, for example, 24 Hz. Therefore, even if the single-frequency sinusoidal signal y received on the common electrode 103 is not a constant DC voltage during the display process, the human eyes cannot effectively capture the display change caused by the single-frequency sinusoidal signal y, so that normal image display can be realized.

In this way, within one image frame, touch signals and display signals are simultaneously provided to the touch display panel 01, so that the touch display panel 01 can achieve both touch operation and image display. Therefore, the problem that the charging time of one row of sub pixels 20 in the touch display screen 01 is insufficient when the touch signals and the display signals are output in a time-dividing manner can be solved.

It can be seen that, after the transistor electrically connected to the pixel electrode 104 is turned off, the pixel voltage Vp charged in the pixel electrode 104 can maintain the voltage when the transistor is turned off within the one image frame. Therefore, before S101, the voltage on the pixel electrode 104 upon the pixel electrode 104 being charged at the timing that the transistor connected with the pixel electrode is turned off is set as the pixel voltage Vp. Therefore, the pixel voltage Vp is a constant value in the driving process, and the luminance average value of any sub pixel in the touch display panel acquired through the driving process is more accurate.

In addition, it can be seen that, upon the frequency of the single-frequency sinusoidal signal $f = 1/T = 1/(2\pi/\omega)$ is determined, the sinusoidal function $y = A \sin(\omega t + \varphi)$ corresponding to the single-frequency sinusoidal signal y and its waveform can be acquired.

Figure 9:
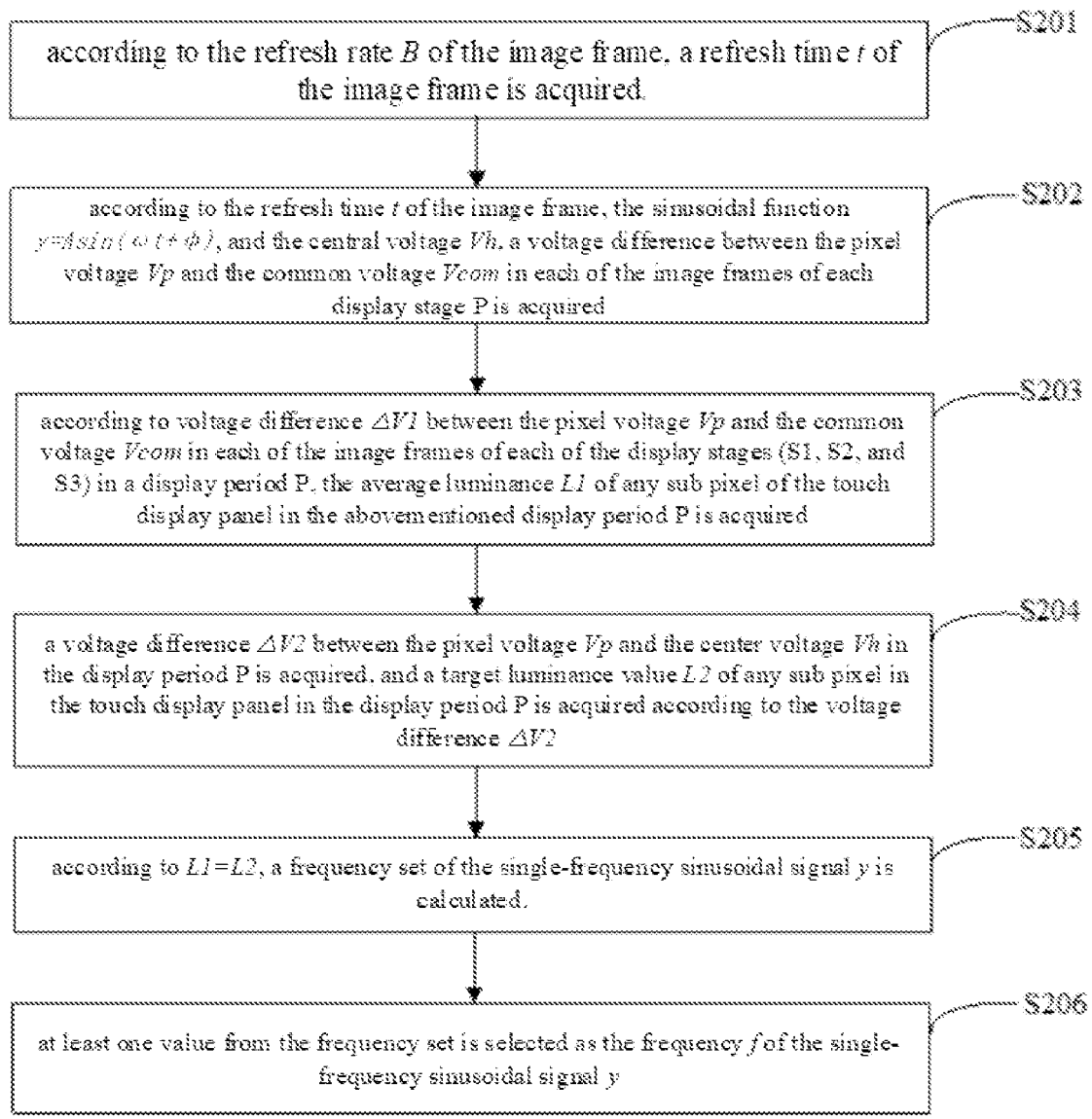
FIG. 9 is a flowchart of another driving method for a touch display panel provided by an embodiment of the present disclosure.

A process for determining the frequency f of the single-frequency sinusoidal signal y is described in the following. As illustrated by FIG. 9, the method for determining the frequency f of the single-frequency sinusoidal signal y includes S201-S206.

S201. According to the refresh rate B of the image frame, a refresh time t of the image frame is acquired.

For example, B=60 Hz, and the refresh time of the image frame t=1/60 Hz=0.01667 s.

S202. According to the refresh time t of the image frame, the sinusoidal function $y = A \sin(\omega t + \varphi)$, and the central voltage Vh, a voltage difference ΔV1 between the pixel voltage Vp and the common voltage Vcom in each of the image frames of each display stage P is acquired.

Herein, upon the pixel voltage Vp being positive in one image frame in the display stage P, the abovementioned voltage difference is:

$$\Delta V1 = |Vp - Vh| - A \sin(\omega(t0 + t \times j) + \varphi);$$

Upon the pixel voltage Vp being negative in one image frame in the display stage P, the abovementioned voltage difference is:

$$\Delta V1 = |Vp - Vh| + A \sin(\omega(t0 + t \times j) + \varphi).$$

Where t0 is a starting time of the single-frequency sinusoidal signal, and t0≥0; t×j is a time of one image frame in one display stage P within the display period P; 0≤j≤C.

For example, upon a ratio of refresh rate B to refresh rate threshold A is C=60 Hz/24 Hz=2.5, 0≤j≤2.5.

The division of the display period P in FIG. 5 is taken as an example, the image frame in the display stage S1 is the first frame in the display period P, in this case, t×j=0.01667 s, and because t=0.01667 s, j=1.

The image frame in the display stage S2 is the second frame in the display period P, in this case, t×j=0.03334 s, and because t=0.01667 s, j=2.

The image frame in the display stage S3 is the 2.5th frame in the display period P, in this case, t×j=0.04168 s, and because t=0.01667 s, j=2.5.

It should be noted that, in order to avoid liquid crystal aging, the pixel voltage Vp supplied to the pixel electrode 104 usually needs to be reversed in polarity. For example, in odd frames, upon the pixel voltage Vp supplied to the pixel electrode 104 being positive; in even frames, the pixel voltage Vp supplied to the pixel electrode 104 is negative. On the contrary, it is available in the same way, so the repeated portions will be omitted herein.

In the case where the display period P includes three display stages S1, S2, and S3 as illustrated by FIG. 5, the voltage difference ΔV1 between the pixel voltage Vp and the common voltage Vcom in each of the image frames in the display period will be described.

In some embodiments of the present disclosure, the image frame in the display stage S1 is an odd frame when the touch display panel 01 displays an image, and in this case, $\Delta V1 = |Vp - Vh| + A \sin(\omega(t0 + 0.01667 \times 2) + \varphi)$.

The image frame in the display stage S2 is an even frame when the touch display panel 01 displays an image. In this case, $\Delta V1 = |Vp - Vh| + A \sin(\omega(t0 + 0.01667 \times 2) + \varphi)$.

The image frame in the display stage S3 is an odd frame when the touch display panel 01 displays an image. In this case, $\Delta V1 = |Vp - Vh| - A \sin(\omega(t0 + 0.01667 \times 2.5) + \varphi)$.

Or, in other embodiments of the present disclosure, the image frame in the display stage S1 is an even frame when the touch display panel 01 displays an image, in which case, $\Delta V1=|Vp-Vh|-A \sin(\omega(t0+0.01667\times 2)+\varphi)$.

The image frame in the display stage S2 is an odd frame when the touch display panel 01 displays an image, in this case, $\Delta V1=|Vp-Vh|-A \sin(\omega(t0+0.01667\times 2)+\varphi)$.

The image frame in the display stage S3 is an even frame when the touch display panel 01 displays an image. In this case, $\Delta V1=|Vp-Vh|+A \sin(\omega(t0+0.01667\times 2.5)+\varphi)$.

Hereinafter, for convenience of explanation, the case where the image frame in display stage S1 is an odd frame when the touch display panel 01 displays an image, the image frame in display stage S2 is an even frame when the touch display panel 01 displays an image, and the image frame in display stage S3 is an odd frame when the touch display panel 01 displays an image, is taken as an example for description.

In addition, upon the input of the single-frequency sinusoidal signal y being synchronized with the gate line progressive scanning, the initial phase co in the sinusoidal function $y=A \sin(\omega t+\varphi)$ can be set to zero before the S201.

S203. According to the voltage difference $\Delta V1$ between the pixel voltage Vp and the common voltage Vcom in each of the image frames of each of the display stages (S1, S2, and S3) in a display period P, the average luminance L1 of any sub pixel 20 of the touch display panel 01 in the abovementioned display period P is acquired.

For example, in some embodiments of the present disclosure, the abovementioned S203 includes:

First, in each of the image frames of each display stage P, according to the abovementioned voltage difference $\Delta V1$, the luminance value of any sub pixel 20 of the touch display panel 01 in the abovementioned display stage P is acquired. For example, in the display stage P, the luminance value of a sub pixel 20 in the display stage S1 as the first frame is Lv1a; the luminance value of the sub pixel 20 in the display stage S2 as the second frame is Lv1b; and the luminance value of the sub pixel 20 in the display stage S2 as the 2.5th frame is Lv1c.

In order to obtain the luminance values Lv1a, Lv1b, and Lv1c of the sub pixel 20 in the display stages in the display period P, a function L=H(V) of the abovementioned voltage difference $\Delta V1$ and the luminance value of the sub pixel can be acquired by using the electro-optical characteristic curve of the touch display panel 01, i.e., the V-T curve, in each display stage P.

Because the electro-optic characteristic curves, i.e., V-T curves, of different touch display panels 01 are different, the present disclosure does not limit the function L=H(V) of the abovementioned voltage difference $\Delta V1$ and the sub pixel luminance value.

Then, according to the function L=H(V), the luminance value of any sub pixel in the touch display panel 01 in the display stage P is calculated.

For example, the image frame in the display stage S1 is an odd frame when the touch display panel 01 displays an image. In this case, the luminance value Lv1a of the sub pixel 20 in the display stage S1 as the first frame is $Lv1a=H(|Vp-Vh|-A \sin(\omega(t0+0.01667)+\varphi))$.

The image frame in the display stage S1 is an even frame when the touch display panel 01 displays an image. In this case, the luminance value Lv1b of the sub pixel 20 in the display stage S1 as the first frame is $Lv1b=H(|Vp-Vh|+A \sin(\omega(t0+0.01667\times 2)+\varphi))$.

The image frame in the display stage S3 is an odd frame when the touch display panel 01 displays an image. In this case, the luminance value Lyle of the sub pixel in the display stage S1 as the first frame is $Lv1c=H(|Vp-Vh|-A \sin(\omega(t0+0.01667\times 2.5)+\varphi))$.

Then, the luminance values (Lv1a, Lv1b, and Lv1c) of every image frame in the display stages in the display period P are weighted and averaged, and the luminance average L1 in the display period is acquired.

That is, $L1=(Lv1a\times 0.01667+Lv1b\times 0.01667+Lv1c\times 0.01667\times 0.5)$ $(0.01667\times 0.5)$.

S204. A voltage difference $\Delta V2$ between the pixel voltage Vp and the center voltage Vh in the display period P is acquired, and a target luminance value L2 of any sub pixel in the touch display panel 01 in the display period P is acquired according to the voltage difference $\Delta V2$.

Specifically, the function L2=H(V) of the luminance value of the sub pixel and the abovementioned voltage difference $\Delta V2$ are acquired by using the electro-optical characteristic curve of the touch display panel 01, i.e., the V-T curve.

S205. According to L1=L2, a frequency set of the single-frequency sinusoidal signal y is calculated.

That is, according to a plurality of L1 acquired from the above steps S201-S203, a plurality of values satisfying L1=L2 are selected to form the frequency set.

S206. At least one value from the frequency set is selected as the frequency f of the single-frequency sinusoidal signal y.

Specifically, the above S206 can include: firstly, according to the resolution of the touch display panel 01, a scanning period Ta of each row of sub pixels 20 is acquired.

The scanning period Ta satisfies a formula: $Ta=1/(B\times S)$. For example, the refresh rate B of the image frame of the touch display panel 01 can be 60 Hz. In addition, S is an amount of gate lines for receiving gate scanning signals in an active area (AA) of the touch display panel 01. For example, S=1920. In this case, the scanning period $Ta=1/(60\times 1920)$.

In addition, the frequency f of the single-frequency sinusoidal signal y can satisfy a formula $f=kT/2$, and $k>0$, k is an integer.

In this way, at least one available frequency f can be selected from the above frequency set, and upon the single-frequency sinusoidal signal y of this frequency being used as the touch signal, the influence on the display in the touch process can be further avoided, thereby improving the accuracy of the frequency of the single-frequency sinusoidal signal y as finally acquired.

Figure 10:
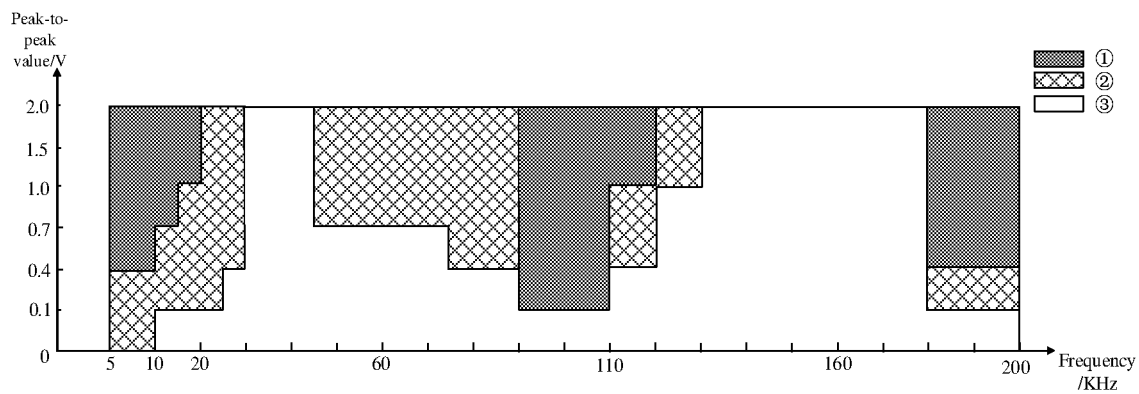
FIG. 10 is a schematic diagram of a test result of the influence of a single-frequency sinusoidal signal on image displaying provided by an embodiment of the present disclosure.

In addition, upon the single-frequency sinusoidal signal y being used as the touch signal, the influence on image display is summarized, and the summary result is shown in FIG. 10. In FIG. 10, the abscissa shows a frequency of the single-frequency sinusoidal signal y, and the ordinate shows an absolute value of voltage difference between a peak voltage and a valley voltage of the single-frequency sinusoidal signal.

The regional block ① indicates that all of the multiple single-frequency sinusoidal signals y with peak-to-peak values and frequencies corresponding to the regional block ① will affect the image display.

The regional block ② indicates that, among the multiple single-frequency sinusoidal signals y with peak-to-peak values and frequencies corresponding to the regional block ②, there is a single-frequency sinusoidal signal y that will not affect the image display.

The regional block ③ indicates that, all of the multiple single-frequency sinusoidal signals y with peak-to-peak values and frequencies corresponding to the regional block ③ will not affect the image display.

In this way, the single-frequency sinusoidal signal y acquired according to the above driving method can be verified by the above test results.

An embodiment of the present disclosure provides a computer readable medium storing a computer program, upon the computer program being executed by a processor, any one of the abovementioned driving methods can be implemented.

Figure 11:
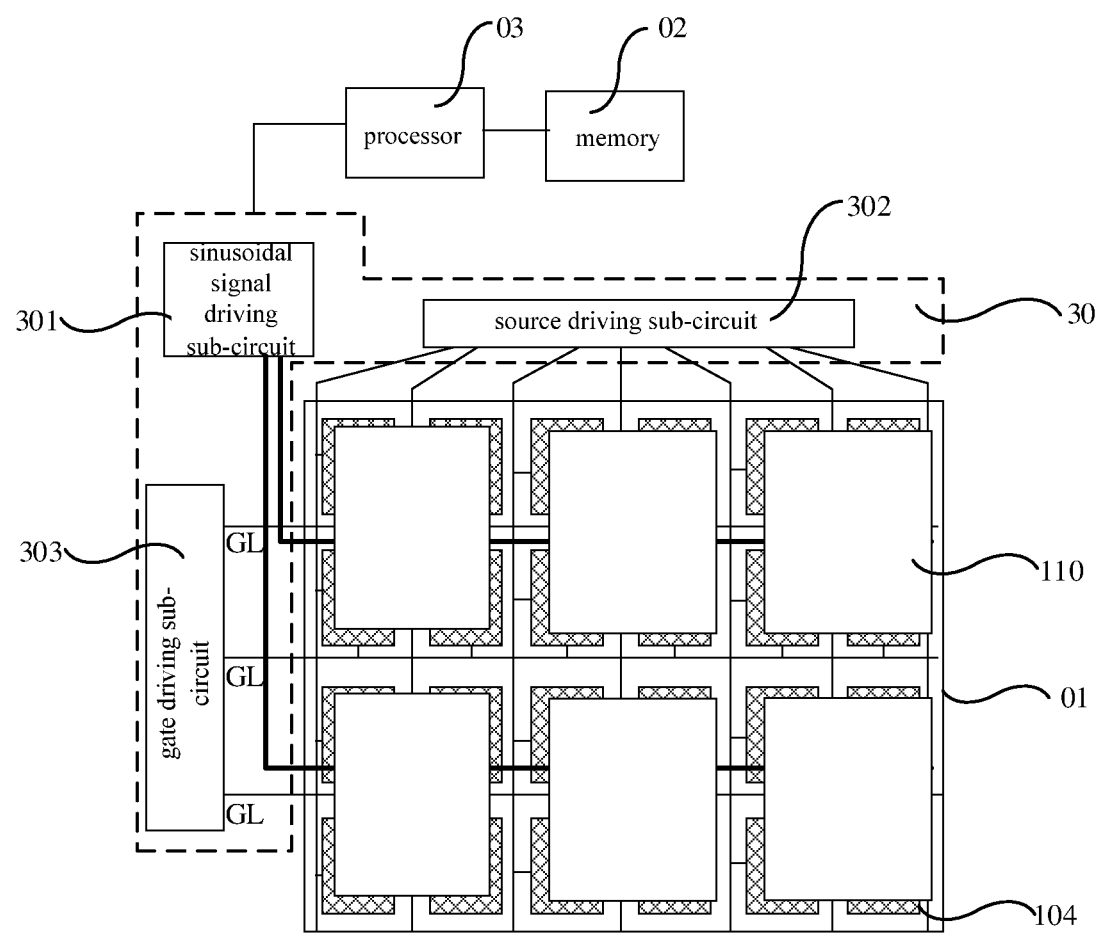
FIG. 11 is a schematic structural diagram of a display device provided by an embodiment of the present disclosure.

An embodiment of the disclosure provides a touch display device, as illustrated by FIG. 11, the touch display device includes a touch display panel 01, a memory 02, and a processor 03.

The memory 02 stores a computer program that can be executed by the processor 03. Upon the processor 03 executing the computer program, any one of the abovementioned driving methods can be implemented. The abovementioned touch display device has the same technical effect as the driving method for the touch display panel provided in the previous embodiment, and the repeated portions are omitted herein.

It should be noted that the memory 02 includes various media which can store program codes, such as ROM, RAM, magnetic disk, or optical disk.

In addition, as illustrated by FIG. 11, the touch display device further includes a driving circuit 30 connected with the processor 03.

The driving circuit 30 includes a sinusoidal signal driving sub-circuit 301 and a source driving sub-circuit 302.

Herein, the sinusoidal signal driving sub-circuit 301 is electrically connected with the plurality of electrode blocks 110 in the common electrode 103. The sinusoidal signal driving sub-circuit 301 is configured to provide the single-frequency sinusoidal signal y as the common voltage Vcom to each of the electrode blocks 110 in the common electrode 103.

The source driving sub-circuit 302 is electrically connected to the plurality of pixel electrodes 104 in the sub pixels 20 in the touch display panel 01, and is configured to provide the above data signals Vdata to the plurality of pixel electrodes 104 as the pixel voltage Vp.

In addition, as illustrated by FIG. 11, the driving circuit 30 further includes a gate driving sub-circuit 303. The gate driving sub-circuit 303 is connected to a plurality of gate lines GL of the touch display panel 01, and the gate driving sub-circuit 303 is configured to provide gate scanning signals to the plurality of gate lines GL.

In this case, the gate driving sub-circuit 303 scans the gate lines GL line by line, thereby turning on the plurality of sub pixels 20 line by line. The turned-on sub pixel 20 receives the data signal Vdata provided by the source driving sub-circuit 302. This data signal Vdata is supplied to the pixel electrode of the sub pixel 20 as a pixel voltage Vp.

In addition, each of the electrode blocks 110 in the common electrode 104 receives the abovementioned single-frequency sinusoidal signal y. The single-frequency sinusoidal signal y can be used as a common voltage Vcom, so that the common electrode 104 and the pixel electrode 104 in the turned-on sub pixel 20 generate an electric field, and drive the liquid crystal molecules in the liquid crystal layer 102 to rotate, thereby achieving display.

Meanwhile, the single-frequency sinusoidal signal y provided to each of the electrode blocks 110 in the common electrode 104 can be used as a touch signal, so that a self-capacitance is formed between the electrode block 110 and the ground terminal. Upon the user performing a touch operation, the capacitance value of the self-capacitance changes, thus determining the position of the touch operation. In addition, it can be seen that the driving method for the touch display panel provided by the embodiment of the present disclosure can reduce the influence of the single-frequency sinusoidal signal y as the touch signal on the image display, so that the touch process and the display process can be synchronized.

The above are only specific implementations of the present disclosure, but the protection scope of the present disclosure is not limited thereto. Changes or substitutions that one skilled in the art can easily think of within the technical scope disclosed in the present disclosure falls within the protection scope of the present disclosure. Therefore, the protection scope of the present disclosure should be subject to the protection scope of the claims.

What is claimed is:

1. A driving method for a touch display panel, wherein the touch display panel comprises a liquid crystal layer, a common electrode, and a plurality of pixel electrodes, the common electrode comprises a plurality of electrode blocks arranged at intervals and insulated from each other, the driving method comprises:
   in a display period, providing a sinusoidal signal y to each of the plurality of electrode blocks in the common electrode;
   wherein the display period comprises N display stages, each of the display stages comprises M image frames, and a refresh rate of the display period is greater than or equal to a refresh rate threshold A, N≥2, M≤1, N is a positive integer, M is a positive number, and the refresh rate threshold is a maximum refresh rate recognizable by human eyes;
   providing data signals to the plurality of the pixel electrodes; and
   an electric field formed by the plurality of pixel electrodes and the common electrode driving liquid crystal molecules in the liquid crystal layer to rotate, and the touch display panel displaying.

2. The driving method for the touch display panel according to claim 1, wherein, in the display period, providing the sinusoidal signal y to each of the plurality of electrode blocks in the common electrode comprises: continuously providing the sinusoidal signal y to each of the plurality of electrode blocks in the common electrode during the entire display period.

3. The driving method for the touch display panel according to claim 1, wherein the sinusoidal signal y is a single-frequency sinusoidal signal.

4. The driving method for the touch display panel according to claim 1, wherein each of the plurality of electrode blocks serves as a touch electrode to form a self-capacitance with a ground terminal.

5. The driving method for the touch display panel according to claim 1, wherein, in the display period, an average luminance value of any sub pixel in the touch display panel is approximately the same as a target luminance value of the sub pixel.

6. The driving method for the touch display panel according to claim 3, wherein, in the display period, before providing the single-frequency sinusoidal signal y to each of the plurality of electrode blocks in the common electrode, the driving method comprises:
   acquiring a central voltage Vh, and upon the central voltage Vh being taken as a voltage of the electrode block in one sub pixel, a luminance value of the sub pixel is taken as the target luminance value of the sub pixel;

wherein the center voltage Vh is a voltage of a symmetrical center of the single-frequency sinusoidal signal.

7. The driving method for the touch display panel according to claim 3, wherein, in the display period, before providing the single-frequency sinusoidal signal y to each of the plurality of electrode blocks in the common electrode, the driving method further comprises:

acquiring a refresh rate B of one image frame of the touch display panel; and determining the amount N of the display stages in the display period and the amount M of the image frames in each of the display stages according to the refresh rate B and the refresh rate of the display period.

8. The driving method for the touch display panel according to claim 7, wherein, in the display period, before providing the single-frequency sinusoidal signal y to each of the plurality of electrode blocks in the common electrode, the driving method further comprises:

acquiring a refresh time t of one image frame according to the refresh rate B of the image frame;

acquiring a voltage difference ΔV1 between a pixel voltage Vp and a common voltage Vcom in each of the display stages according to the refresh time t of the image frame, the sinusoidal function y=A sin(ωt+φ), and the central voltage Vh;

wherein, in one display stage, upon the pixel voltage Vp being positive, the voltage difference is:

ΔV1=|Vp−Vh|−A sin(ω(t0+t×j)+φ);

in a display stage, upon the pixel voltage Vp being negative, the voltage difference is:

ΔV1=|Vp−Vh|+A sin(ω(t0+t×j)+φ);

t0 is a starting time of the single-frequency sinusoidal signal, and t0≥0; t×j is a time of one display stage in the display period, and 0≤j≤C;

acquiring an average luminance value L1 of any sub pixel in the touch display panel in the display period according to the voltage difference ΔV1 in each of the display stages in the display period;

acquiring a voltage difference ΔV2 between the pixel voltage Vp and the center voltage Vh in the display period, and acquiring a target value luminance L2 of any sub pixel in the touch display panel in the display period according to the voltage difference ΔV2;

calculating a frequency set of the single-frequency sinusoidal signal according to L1=L2; and selecting at least one value from the frequency set as a frequency of the single-frequency sinusoidal signal.

9. The driving method for the touch display panel according to claim 8, wherein acquiring the luminance average L1 in the display period of any sub pixel in the touch display panel according to the voltage difference ΔV1 in each of the display stages comprises:

in each of the display stages, acquiring a luminance value of any sub pixel in the touch display panel in the display stage according to the voltage difference ΔV1; and carrying out weighted average on multiple luminance values of the display stages in the display period to acquire the average luminance L1 in the display period.

10. The driving method for the touch display panel according to claim 9, wherein, in each of the display stages, acquiring the luminance value of any sub pixel in the touch display panel in the display stage according to the voltage difference ΔV1 comprises:

in each of the display stages, acquire a function L=H(V) of the voltage difference ΔV1 and the luminance value of the sub pixel by using an electro-optical characteristic curve of the touch display panel; and calculating the luminance value of any sub pixel in the touch display panel in the display stage according to the function L=H(V).

11. The driving method for the touch display panel according to claim 8, wherein selecting at least one value from the frequency set as the frequency of the single-frequency sinusoidal signal comprises:

acquiring a scanning period Ta of each row of sub pixels according to a resolution of the touch display panel;

the frequency of the single-frequency sinusoidal signal is f=kTa/2, k>0, k is an integer.

12. The driving method for the touch display panel according to claim 11, wherein the scanning period Ta satisfies a formula: Ta=1/(B×S), in which S is an amount of gate lines for receiving gate scanning signals in an active area of the touch display panel.

13. The driving method for the touch display panel according to claim 8, wherein, before acquiring the voltage difference ΔV1 between the pixel voltage Vp and the common voltage Vcom in each of the display stages, the driving method further comprises:

setting an initial phase φ in the sinusoidal function y=A sin(ωt+φ) to zero.

14. The driving method for the touch display panel according to claim 9, wherein, before acquiring the voltage difference ΔV1 between the pixel voltage Vp and the common voltage Vcom in each of the display stages, the driving method further comprises:

setting a voltage on the charged pixel electrode at a timing that a transistor connected with the pixel electrode is turned off as the pixel voltage Vp.

15. A touch display device, comprising a touch display panel, a memory and a processor, wherein the memory stores a computer program capable of being executed by the processor, and the processor implements the driving method according to claim 1 upon executing the computer program.

16. The touch display device according to claim 15, wherein the touch display panel comprises a liquid crystal layer, a common electrode, and a plurality of pixel electrodes; the common electrode comprises a plurality of electrode blocks which are arranged at intervals and insulated from each other;

the touch display device further comprises a driving circuit connected with the processor; the driving circuit comprises a sinusoidal signal driving sub-circuit and a source driving sub-circuit;

the sinusoidal signal driving sub-circuit is electrically connected with the plurality of electrode blocks in the common electrode, and is configured for providing the sinusoidal signal y to each of the plurality of electrode blocks in the common electrode;

the source driving sub-circuit is electrically connected with the pixel electrodes in respective sub pixels in the touch display panel, and is configured for providing data signals to the plurality of pixel electrodes.

17. The touch display device according to claim 16, wherein the driving circuit further comprises a gate driving sub-circuit; the gate driving sub-circuit is connected with a plurality of gate lines of the touch display panel, and is configured for providing gate scanning signals to the plurality of gate lines.

18. A computer readable medium, storing a computer program, wherein the computer program implements the method according to claim 1 upon being executed by a processor.

19. The driving method for the touch display panel according to claim 2, wherein the sinusoidal signal y is a single-frequency sinusoidal signal.

20. The driving method for the touch display panel according to claim 19, wherein, in the display period, before providing the single-frequency sinusoidal signal y to each of the plurality of electrode blocks in the common electrode, the driving method comprises:
 acquiring a central voltage Vh, and upon the central voltage Vh being taken as a voltage of the electrode block in one sub pixel, a luminance value of the sub pixel is taken as the target luminance value of the sub pixel;
 wherein the center voltage Vh is a voltage of a symmetrical center of the single-frequency sinusoidal signal.

\* \* \* \* \*